United States Patent [19]
Yakemoto et al.

[11] Patent Number: 5,296,174
[45] Date of Patent: Mar. 22, 1994

[54] METHOD OF CONTROLLING HOLDING PRESSURE IN INJECTION MOLDING AND APPARATUS THEREFOR

[75] Inventors: Kazutoshi Yakemoto; Tsukasa Shiroganeya, both of Hiroshima, Japan

[73] Assignee: Japan Steel Works Co., Ltd., Tokyo, Japan

[21] Appl. No.: 854,070

[22] Filed: Mar. 19, 1992

[30] Foreign Application Priority Data

Mar. 19, 1991 [JP] Japan ................................ 3-078171
May 10, 1991 [JP] Japan ................................ 3-133322

[51] Int. Cl.⁵ .................... B29C 45/77; B29C 45/78
[52] U.S. Cl. ............................. 264/40.5; 264/328.1; 425/149; 425/159; 425/166
[58] Field of Search ................... 264/40.1, 40.5, 40.6, 264/40.7, 328.1; 425/135, 145, 143, 144, 149, 147, 155, 159, 162, 166; 364/476

[56] References Cited

U.S. PATENT DOCUMENTS

| | | | |
|---|---|---|---|
| 4,932,854 | 6/1990 | Matsuda et al. | 425/145 |
| 4,983,336 | 1/1991 | Langlois | 425/145 |
| 5,088,911 | 2/1992 | Kumazaki | 425/145 |

FOREIGN PATENT DOCUMENTS

| | | | |
|---|---|---|---|
| 4026731 | 2/1992 | Fed. Rep. of Germany . | |
| 51-26968 | 3/1976 | Japan | 425/145 |
| 63-3926 | 1/1988 | Japan . | |
| 63-3927 | 1/1988 | Japan . | |

OTHER PUBLICATIONS

Matzke, Dr. Ing. Andreas, "Prozessrechnereinsatz Beim Spritzgiessen", Institut for Kunststoffverarbeitung, Process Control Computers In Injection Molding, pp. 71–87 and Translation pp. 1–17, 1989.

*Primary Examiner*—Jill L. Heitbrink
*Attorney, Agent, or Firm*—Sughrue, Mion, Zinn, Macpeak & Seas

[57] ABSTRACT

A method of controlling holding pressure in an injection molding operation and an apparatus therefor, wherein the quality of molded products can be controlled with a high accuracy without the need for a pressure sensor in a mold and without requiring any additional data such as the thickness of a molded product, the effective heat diffusion rate, and so on. Further, a method for estimating resin temperature in injection molding and an appartus therefor, wherein in-mold resin temperature in a holding pressure and cooling stage is estimated during injection at a high speed and with a high accuracy.

8 Claims, 5 Drawing Sheets

METHOD OF CONTROLLING HOLDING PRESSURE IN INJECTION MOLDING AND APPARATUS THEREFOR

BACKGROUND OF THE INVENTION

The present invention relates to a method of controlling holding pressure retention in an injection molding process and an apparatus therefor.

Injection molding is performed under various temperatures due to factors such as a temperature change of seasons, a temperature change between day and night, and so on. These temperature changes mainly affect the temperature of a metal mold or of melted resin which is a molding material to be injected into the metal mold, so that the heat history of the resin is changed in the process where the resin is charged into the mold, cooled and solidified therein, and then taken out from the mold. The change of the heat history of the resin in the mold changes the viscosity and density of the resin, and, as a result, for example, produces a change of resin pressure in the mold. Therefore, a change is produced in the weight and size of molded products, so that the quality of molded products is not consistent.

A known method of solving such a problem caused by temperature changes utilizes a pressure sensor provided in a mold, resin temperature in the mold is detected by the sensor or calculated from the thickness of a molded product, effective heat diffusion rate, and so on, and the specific volume of a molded product is controlled to be a desired value regardless of the temperature change on the basis of PVT property data which is basic physical-property data expressing the relationship among the pressure (P), the specific volume (V) and the temperature (T) of the molding material (resin) (see Japanese Unexamined Patent Publication Nos. Sho. 63-3926, and Sho. 63-3927).

In each of the above-mentioned conventional methods, it is necessary to attach a pressure sensor in a mold, which is not economical. Also, it is difficult to adjust and attach the sensor. In addition, since a conventional calculation expression of in-mold resin temperature is approximate, the accuracy of calculation is not high so that the quality of molded products cannot be controlled with a high accuracy. In addition, additional data such as the thickness of a molded product, the effective heat diffusion rate, and so on are required, and it is troublesome to collect this data.

In addition, in injection molding, for the purpose of process controlling, process monitoring, and so on, it is necessary to control the injection speed, the pressure retention force, and so on, correspondingly to the in-mold resin temperature. As a method for obtaining the in-mold resin temperature, conventionally known are the following methods:

(1) A method in which a temperature sensor is provided in a cavity portion so as to directly measure the in-mold resin temperature; and (2) A method in which an unsteady state heat condition analysis technique is used to thereby estimate the in-mold resin temperature from the following calculations a, b or c:

a. Calculation by numerical analysis by calculus of finite differences;

b. Calculation by a calculation expression obtained analytically; and c. Calculation by the following approximate expression:

$$T(t) = Tw + (Tr - Tw) \cdot (8/\pi^2) \cdot exp(-\alpha \cdot \pi^2 \cdot t^2/R^2)$$

where:

T(t) represents a sectional-direction average value of the in-mold resin temperature;

Tw represents an average value of the metal-mold temperature (=(Twf+Twm)/2, Twf representing the fixed-side metal-mold temperature, Twm representing the movable-side metal-mold temperature);

Tr represents the injected-resin temperature;

$\alpha = K/(\rho \cdot Cp)$;

K represents the thermal conductivity of the molding material;

$\rho$ represents the density of the molding material;

Cp represents the specific heat of the molding material;

t represents the point of time to be a subject of calculation; and

R represents the thickness of a molded product.

Of the above-mentioned conventional methods, the method (1) requires a temperature sensor, and thus is not economical. In addition, if the in-mold resin temperature in the holding pressure and cooling stage cannot be obtained in the filing stage of injecting melted resin into the mold before the holding pressure and cooling stage, it is difficult to control the behavior of resin in holding pressure and cooling stage in which the resin in the mold is almost being solidified.

In the method (2), on the other hand, because of the complicated calculation, it takes many seconds or even several minutes to obtain an estimated value (a and b), and because of approximation errors, the accuracy is low (c).

SUMMARY OF THE INVENTION

It is therefore an object of the present invention to solve the foregoing problems in the conventional art.

It is another object of the present invention to provide a method of controlling holding pressure and an apparatus therefor, in which the quality of molded products can be controlled with a high accuracy without the necessity of a pressure sensor in a mold and without requiring any additional data such as the thickness of a molded product, the effective heat diffusion rate, and so on.

It is a further object of the present invention to provide a method of estimating resin temperature in injection molding and an apparatus therefor, in which in-mold resin temperature in a holding pressure and cooling stage can be estimated in a filling stage at a high speed and with a high accuracy.

In order to attain the above objects, according to an aspect of the present invention, in the injection molding process having a filling stage for injecting melted resin from a cylinder of an injection molding machine into a cavity of a metal mold through a nozzle and resin paths by advance of a screw, and a holding pressure stage of supplementing the melted resin by pressing the screw after filling the melted resin into the cavity so as to compensate for shrinkage of the melted resin which is caused as the melted resin is cooled and solidified in the cavity; the holding pressure control method comprises; a process in which, in the filling stage, in-mold resin temperature at a given time in the holding pressure stage is estimated on the basis of metal-mold temperature and resin temperature in the resin paths, in-mold resin pressure required for attaining aimed weight of a product is obtained from the estimated in-mold resin temperature, and a holding pressure setting value is obtained from the obtained in-mold resin pressure; and another process in which, in the holding pressure stage, the holding pressure is controlled by the obtained holding pressure setting value.

In the holding pressure control method according to the present invention, the in-mold resin temperature in the holding pressure stage can be estimated from the following equation:

$$T(t) = Ts(t) + \{Trs - Ts(t)\}(Tw - Tws)/(Trs - Tws) + \{Ts(t) - Tws\}(Tr - Trs)/(Trs - Tws)$$

where:
Tw represents the metal-mold temperature;
Tws represents the metal-mold temperature in a shot in which a good product was molded;
Tr represents the resin temperature in the resin paths (2a, 3c, 3d, 3e, 3f);
Trs represents the resin temperature in the resin paths (2a, 3c, 3d, 3e, 3f) in a shot in which a good product was molded; and
t represents a point of time.

The above expression is a calculation expression containing no approximation errors.

In the holding pressure control method according to the present invention, it is preferable, from experience, that the resin temperature at the same point of time (tg) as that where a no flow temperature was established in a shot in which a good product was molded is estimated in each shot by use of the above estimation expression.

In the holding pressure control method according to the present invention, it is preferable that each of the in-mold resin pressure and the in-mold resin temperature is expressed by a function of a specific volume of the in-mold resin.

According to another aspect of the present invention, the apparatus for controlling holding pressure in an injection molding machine comprises: a metal-mold temperature sensor for detecting the temperature of a metal mold; a resin temperature sensor for detecting the temperature of melted resin in resin paths; an operation processing portion for estimating the in-mold resin temperature in a holding pressure stage on the basis of the respective detection values of the metal-mold temperature sensor and the resin temperature sensor, for obtaining the in-mold resin pressure required for attaining aimed weight of a product from the estimated in-mold resin temperature, and for obtaining holding pressure setting value from the in-mold resin pressure; and a holding pressure control portion for controlling holding pressure on the basis of the holding pressure setting value obtained by the operation processing portion.

The in-mold resin temperature can be estimated if the metal-mold temperature and resin path temperature are known. In addition, it is known that the relationship among the in-mold resin pressure, the in-mold resin temperature and the in-mold resin specific volume can be expressed in various forms, and the in-mold resin specific volume can be obtained from the weight of a molded product. The in-mold resin pressure required for obtaining an aimed value of the weight of a molded product can be obtained from the above-mentioned relationship among the in-mold resin pressure, the in-mold resin temperature and the in-mold resin specific volume, and the above-mentioned estimated value of the in-mold resin temperature. Further, the in-mold resin pressure can be approximated by the metal-mold temperature, the resin-path temperature and the holding pressure setting value. Therefore, the holding pressure setting value can be obtained on the basis of the metal-mold temperature and the resin-path temperature without requiring any pressure sensor and any additional data.

Further, according to a further aspect of the present invention, in an injection molding process having a filling stage for filling melted resin which is in a cylinder of an injection molding machine, into a cavity of a metal mold, and a holding pressure and cooling stage of supplementing the melted resin after filling of the melted resin into the cavity so as to compensate for shrinkage of the melted resin which is caused as the melted resin is cooled and solidified in the cavity; the method of estimating resin temperature in injection molding comprises:

a step of obtaining in-mold resin reference temperature from a solution of unsteady state heat conduction analysis before running of injection molding; and another step of measuring metal-mold temperature and injected-resin temperature, and correcting the in-mold resin reference temperature correspondingly to influences, on in-mold resin temperature, due to deviations of the measured metal-mold temperature and injected-resin temperature from respective reference temperature values thereof to thereby calculate and estimate in-mold resin temperature in the filling stage or in the holding pressure and cooling stage.

Preferably, in the method of estimating the resin temperature in injection molding, the in-mold resin reference temperature $Ts(t,x)$ is expressed by:

$$Ts(t,x) = Twfs + A + B \cdot x + \sum_{J=0}^{N} \exp(-\alpha \cdot nj^2 \cdot t) \cdot Dj \cdot \{(K/h) \cdot nj \cdot \cos(nj \cdot x) + \sin(nj \cdot x)\}$$

where:
Twfs represents the fixed-side metal-mold reference temperature;
Twms represents the movable-side metal-mold reference temperature;
Trs represents the injected-resin reference temperature;
R represents the thickness of a molded product;
K represents the thermal conductivity of molding material;
h represents the heat transfer coefficient between the molding material and the metal-mold wall surface;
$\rho$ represents the density of the molding material;
Cp represents the specific heat of the molding material;
x represents the position to be a subject of calculation;
$\alpha = K/(\rho \cdot Cp)$;
$A = (1 - S/h) \cdot (Twms - Twfs)$;
$B = -(S/K) \cdot (Twms - Twfs)$;
$S = 1/(2/h + R/K)$;
$\tan(nj \cdot R/2) = (h/K)/nj$;
$Dj = 4 \cdot (h/K)^2 \cdot \{Trs - (Twfs + Twms)/2\}/[nj \cdot \{nj^2 + (h/K)^2 \cdot R + 2(h/K)\}]$;
N represents the number of repetitions of series; and
t represents the point of time to be a subject of calculation;

and the in-mold resin temperature T(t,x) to be calculated and estimated is expressed by:

$$T(t,x) = Ts(t,x) + (\partial T/\partial Twf)\cdot \Delta Twf + (\partial T/\partial \delta)\cdot \Delta D + (\partial T/\partial Tr)\cdot \Delta Tr$$

where:
Twf represents the measured fixed-side metal-mold temperature;
Twm represents the measured movable-side metal-mold temperature;
Tr represents the measured injected-resin temperature;
$\Delta Twf = Twf - Twfs$;
$D = Twms - Twfs$;
$\Delta D = (Twm - Twf) - (Twms - Twfs)$;
$\Delta Tr = Tr - Trs$;
$\partial T/\partial Twf = \{Trs - Ts(t,x) - (R/2 - x)\cdot \xi_2 \cdot D\}/(Trs - Tws)$;
$\partial T/\partial D = [(\xi_1 + x\cdot \xi_2)\cdot (Trs - Tws) - (\frac{1}{2})\cdot \{Ts(t,x) - Twfs - (\xi_1 + x\cdot \xi_2)\cdot D\}]/(Trs - Tws)$;
$\partial T/\partial Tr = \{Ts(t,x) - Twfs - (\xi_1 + x\cdot \xi_2)\cdot D\}/(Trs - Tws)$;
$\xi_1 = (1 + h\cdot R/K)/(2 + h\cdot R/K)$;
$\xi_2 = -(h/K)/(2 + h\cdot R/K)$; and
$Tws = (Twms + Twfs)/2$ According to a still further aspect of the present invention, in a holding pressure control apparatus for controlling a charging step of injecting melted resin from a cylinder of an injection molding machine into a cavity portion of a metal mold and a holding pressure and cooling stage of supplementing the melted resin after charging the melted resin into the cavity so as to compensate for shrinkage of the melted resin which is caused as the melted resin is cooled and solidified in the cavity; the apparatus for estimating resin temperature in injection molding comprises:

a metal-mold temperature sensor for detecting temperature of the metal-mold;

a resin temperature sensor for detecting injected-resin temperature in resin paths;

an operation processing portion which obtains in-mold resin reference temperature by a solution of unsteady state heat condition analysis before running of injection molding, and in running of injection molding, receives the metal-mold temperature and the injected-resin temperature respectively detected by the metal-mold temperature sensor and the resin temperature sensor, and corrects the in-mold resin reference temperature correspondingly to influences, onto the in-mold resin temperature, of deviations of the received metal-mold temperature and injected-resin temperature from respective reference temperature values thereof to thereby calculate and estimate in-mold resin temperature in the filling stage or in the holding pressure and cooling stage.

In order to obtain the in-mold resin reference temperature from a solution of unsteady state heat condition analysis, it is necessary to execute a complicated calculation, and which requires a great deal of time. Therefore, this calculation is performed before running of injection molding to allow for sufficient time.

During the running of injection molding, the above-mentioned reference in-mold resin temperature is corrected correspondingly to the influences of deviations of the measured metal-mold temperature and injected-resin temperature from their reference temperature values to thereby calculate the in-mold resin temperature in the filling stage or in the holding pressure and cooling stage. Since this stage can be performed without much time, it may be performed in the filling stage.

That is, of the steps required for estimating the in-mold resin temperature, the steps which need much time are finished before running of injection molding so that only the steps which do no need much time are performed during the running of injection molding. Accordingly, the in-mold resin temperature can be estimated at a high speed without using an approximate expression, and thus approximation errors can be eliminated.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

An embodiment of the present invention will be described with reference to the drawings.

Figure 1:
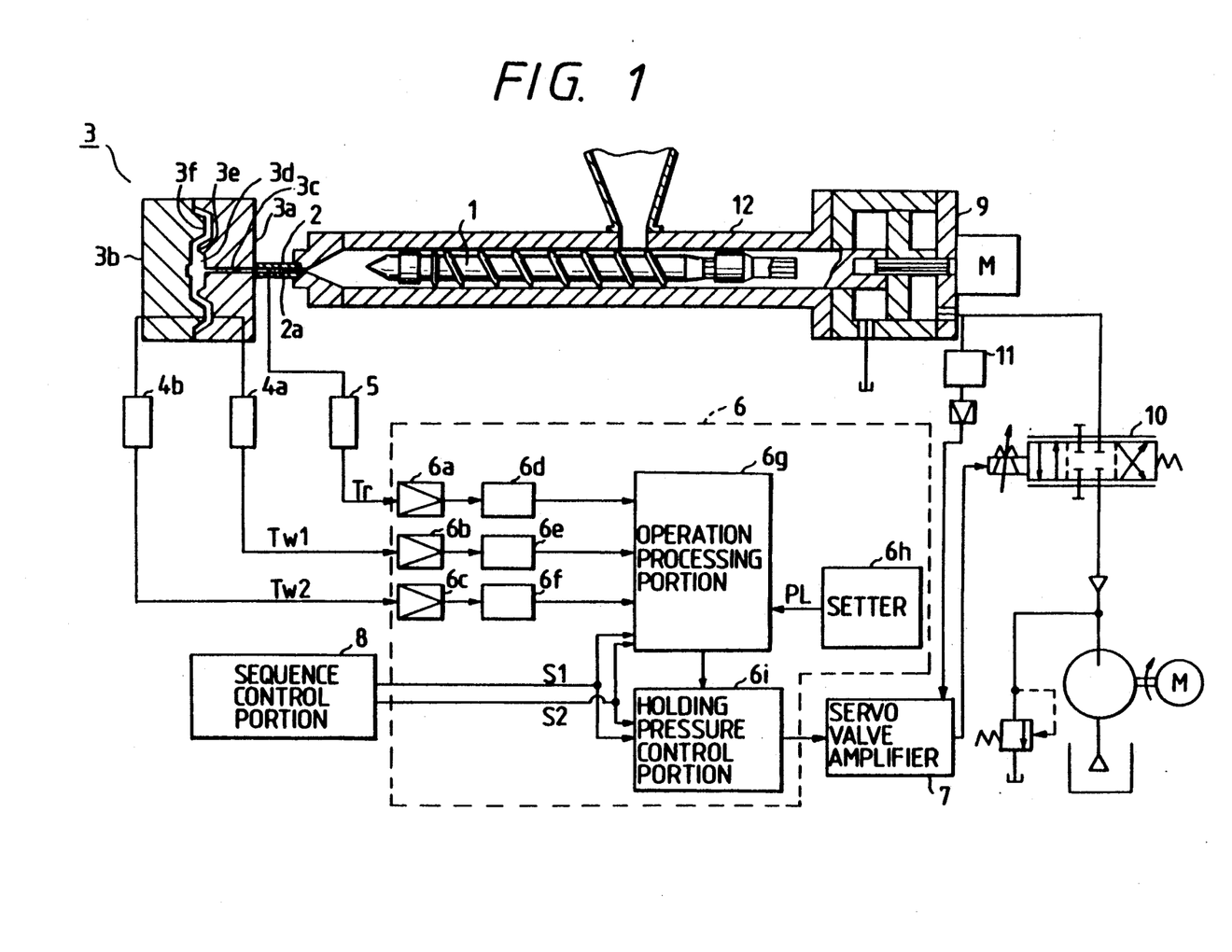
FIG. 1 is a diagram illustrating an embodiment of the present invention.

FIG. 1 shows an embodiment of the present invention, in which a screw 1 is arranged so as to be movable forward and backward in the illustrated right and left directions in a cylinder 12 by a driving force of an oil hydraulic cylinder 9. A nozzle resin path 2a communicating with the cylinder 12 and a metal mold 3 is formed in a nozzle 2 provided on an end of the cylinder 12, the metal mold 3 being constituted by a fixed-side metal mold 3a and a movable-side metal mold 3b. Inside the metal mold 3, a sprue portion 3c, a runner portion 3d, a gate portion 3e and a cavity portion 3f are formed so as to be arranged in the above-mentioned order from the nozzle 2.

A resin temperature sensor 5 is attached in the nozzle resin path 2a. A fixed-side metal-mold temperature sensor 4a is attached to the fixed-side metal mold 3a, and a movable-side metal mold sensor 4b is attached to the movable-side metal mold 3b. The resin temperature sensor 5 may be attached to any portion, so long as the portion is a resin path, for example, to the sprue portion 3c, the runner portion 3d or the cavity portion 3f, in addition to the nozzle resin path 2a. The respective signal output terminals of the resin temperature sensor 5 and the metal-mold temperature sensors 4a and 4b are connected to corresponding A/D converters 6d, 6e and 6f through corresponding amplifiers 6a, 6b and 6c in a control unit 6 respectively, and the respective output terminals of the A/D converters 6d, 6e and 6f are connected to the corresponding input terminals of an operation processing portion 6g respectively.

The operation processing portion 6g is constituted by a microcomputer which computes the holding pressure setting value PL on the basis of: the outputs of the respective A/D converters 6d, 6e and 6f; various setting values such as constants a, b, c, d, e, f, πi, ω, R', W, V, etc. set in setter 6h which will be described later; and an injection start signal S1 and a holding pressure switching signal S2 supplied from a sequence control portion 8 for controlling various timing. The computed holding pressure setting value PL is supplied as a digital signal to a holding pressure control portion 6i. The holding pressure control portion 6i converts, into a voltage signal, the digital signal which is supplied from the operation processing portion 6g and which represents the holding pressure setting value PL, and supplies the converted voltage signal to a servo valve amplifier 7. The servo valve amplifier 7 uses the value of the voltage signal supplied from the holding pressure control portion 6i as the holding pressure setting value, and supplies a control voltage to a servo valve 10 on the basis of a detection value of an oil pressure sensor 11 for detecting the pressure of the oil hydraulic cylinder 9 so as to cause the pressure of the oil hydraulic cylinder 9 to take the holding pressure setting value.

Next, the computation of the holding pressure setting value PL by the operation processing portion 6g will be described.

In the following computation, the point of time where the melted resin has been filled into the fixed-side metal mold 3a and the movable-side metal mold 3b, that is, the filling end time (holding pressure start time), is made to be a point of time 0 (zero), and the elapse from the time 0 and the point of time then are represented by t. In order to indicate that the in-mold resin temperature and in-mold resin pressure which will be described later are functions of time respectively, (t) is affixed to respective signs in such a manner as T(t), Ts(t), P(t) and Ps(t). In each shot, it is assumed that the metal-mold temperature Tw does not change during one shot, and that any one of the metal-mold temperature Tw1 of the fixed-side metal mold 3a, the metal-mold temperature Tw2 of the movable-side metal-mold 3b, and the average of the both temperatures Tw1 and Tw2 is used as the metal-mold temperature Tw. Of various values of the metal-mold temperature Tw, a value in a shot in which a predetermined good product was molded (hereinafter referred to as "predetermined shot") is called metal-mold temperature Tws. In addition, of various values of the resin temperature supplied from the resin temperature sensor 5 in a filling stage, any one of the maximum value or the average value from injection start till holding pressure switching, a sampled value at the time of holding pressure switching, and a sampled value at the time of injection start is used as initial resin temperature Tr, and particularly a value in the above-mentioned predetermined shot is used as initial resin temperature Trs in the predetermined shot.

Assume that the average temperature in the direction of the thickness of a molded product in a mold at the time t in the above-mentioned predetermined shot is the in-mold resin temperature Ts(t) in the predetermined shot, and assume that the in-mold resin temperature when the metal mold temperature and the initial resin temperature change from Tws and Trs to Tw and Tr respectively in a shot other than the above-mentioned predetermined shot is T(t), and from the result of unsteady state heat condition analysis of a one-dimension infinite plate, it can be considered that there is the relationship of the following expression (1) between the in-mold resin temperature T(t) after the change (in a shot other than the predetermined shot) and the in-mold resin temperature Ts(t) before the change (in the predetermined shot).

$$T(t) = Ts(t) + \{Trs - Ts(t)\}(Tw - Tws)/(Trs - Tws) + \{Ts(t) - Tws\}(Tr - Trs)/(Trs - Tws) \quad (1)$$

The expression (1) can be applied to not only a one-dimensional infinite plate but also a two- or three-dimensional column, rectangular prism, half-infinite plate, sphere, etc. having an equi-temperature wall. In addition, the expression (1) can be also applied to the case of taking a heat transfer coefficient into consideration.

It is considered herein that the average in-mold resin density depends on various conditions near the time where the in-mold resin temperature T(t) reaches the no flow temperature Tg, that is, the in-mold resin pressure P(t) and the in-mold resin temperature T(t) near that time. This is because the mass of the molding material charged into a mold is almost fixed at the no flow temperature Tg so that high accuracy of calculation can be expected. In addition, in the above-mentioned predetermined shot, let the time to take the no flow temperature Tg be the no flow time tg. Further assume that the relationship among the in-mold resin pressure P(t), the in-mold resin temperature T(t) and the in-mold resin specific volume v is expressed, as its function form, by the following expression (2) of a Spencer and Gilmore state equation.

$$\{P(t)+\pi i\}(v-\omega)=R'\{T(t)+273\} \quad (2)$$

where:
πi represents the internal pressure (Kg/cm$^2$);
ω represents the specific volume at the absolute temperature 0 (cm$^3$/g);
R' represents the modified gas constant [(Kg/cm$^2$·cm$^3$/g)/°K];
v=V/W
W represents the weight of a molded product (g); and
V represents the volume of a cavity (cm$^3$).

The above-mentioned internal pressure πi, the specific volume ω, and the modified gas constant R' are material constants depending on the material.

At the same time as the above-mentioned no flow time tg in each shot, the in-mold resin pressure P(tg) which the shot requires for obtaining an aimed value W1 of the weight of a molded product is obtained by making the time t in the above expression (1) be the above-mentioned no flow time tg on the basis of the above-mentioned respective assumption, and setting the in-mold resin pressure P(t)=P(tg), the in-mold resin temperature T(t)=T(tg) and the in-mold resin specific volume v=v1(=V/W1), so that the in-mold resin pressure P(tg) can be given by the following expression (3).

$$P(tg)=R'\{T(tg)+273\}/(v1-\omega)-\pi i \quad (3)$$

The in-mold resin pressure P(t) in each shot can be approximated by the following expression (4) by use of the metal-mold temperature Tw, the initial resin temperature Tr and the holding pressure setting value PL in the shot.

$$P(t)=a_1Tw+a_2Tw^2+b_1Tr+b_2Tr^2+cPL+d \quad (4)$$

where $a_1$, $a_2$, $b_1$, $b_2$, c and d are constants set in advance in common to the respective shots.

In a shot other than the above-mentioned predetermined shot, the holding pressure setting value PL required for obtaining the in-mold resin pressure P(tg) in the expression (3), that is, required for obtaining the aimed value W1 of the weight of a molded product is obtained by substituting the metal-mold temperature Tw and the initial resin temperature Tr measured in the shot into the expression (4), so that the in-mold resin pressure P(tg) can be given by the following expression (5).

$$PL = \{P(tg) - a_1 Tw - a_2 Tw^2 - b_1 Tr - b_2 Tr^2 - d\}/c \quad (5)$$

By substituting the expression (3) into the in-mold resin pressure P(tg) in the expression (5), the holding pressure setting value PL for obtaining an aimed value W1 of the weight of a molded product in each shot can be obtained with a high accuracy by the computation of the operation processing portion 6g.

Figure 2A:
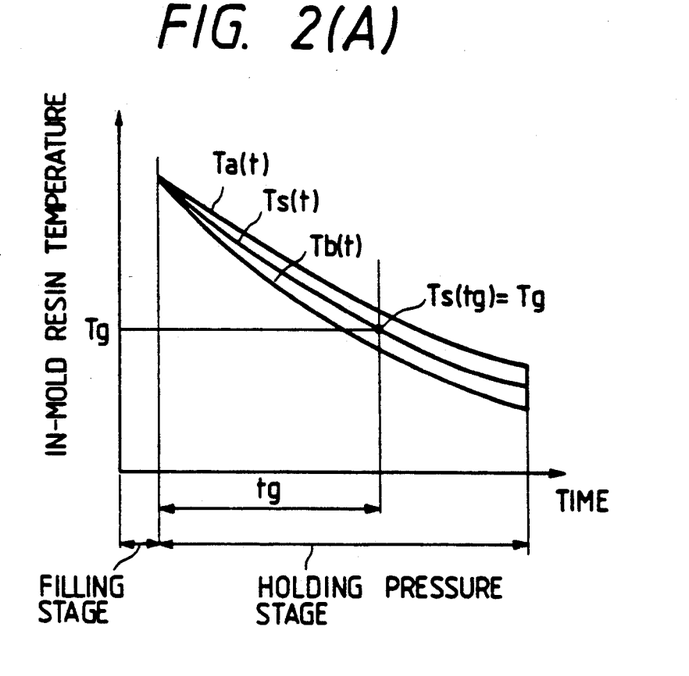
FIGS. 2(A) and 2(B) are graphs illustrating temporal changes of various in-mold states in this embodiment, FIG. 2(A) being a graph illustrating a temporal change of temperature, FIG. 2(B) being a graph illustrating a temporal change of pressure.
Figure 2B:
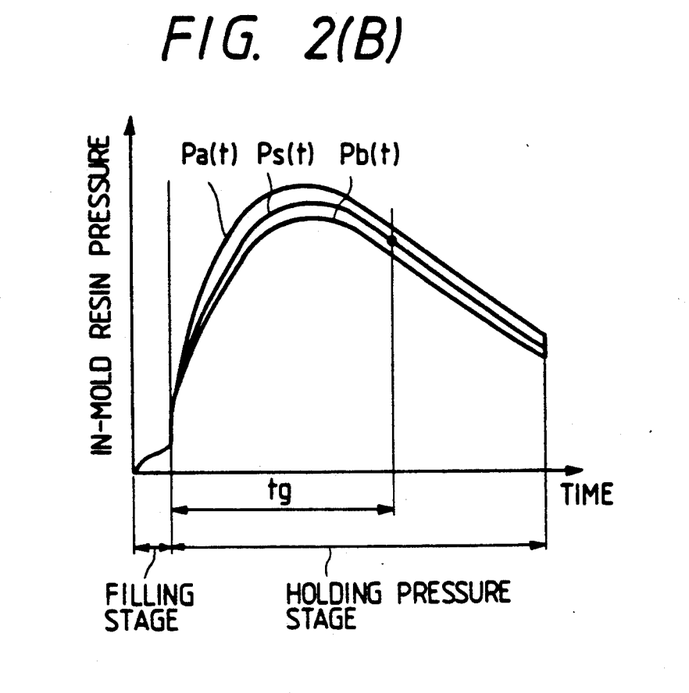

FIGS. 2(A) and 2(B) shows temporal changes of various states in a mold in this embodiment, FIG. 2(A) being a graph illustrating a temporal change of the in-mold resin temperature T(t), FIG. 2(B) being a graph illustrating a temporal change of the in-mold resin pressure P(t).

As shown in FIG. 2(A), the in-mold resin temperature Ts(t) in the predetermined shot decreases monotonously after holding pressure start, so that the in-mold resin temperature becomes Ts(tg)=Tg after the elapse of t. On the other hand, in a shot other than the predetermined shot, the in-mold resin temperature T(t) changes into T(t)=Ta(t) or T(t)=Tb(t) in every shot by the metal-mold temperature Tw and the initial resin temperature Tr.

On the other hand, as shown in FIG. 2(B), the in-mold resin pressure Ps(t) in the predetermined shot changes while according to a mountain-like curve, and in a shot other than the predetermined shot, the in-mold resin pressure P(t) changes into P(t)=Pa(t) or P(t)=Pb(t) in every shot as the above-mentioned in-mold resin temperature T(t) changes.

However, in either change, the holding pressure setting value PL for obtaining an aimed value W1 of the weight of a molded product in each shot can be obtained by the above-mentioned computation.

Figure 3:
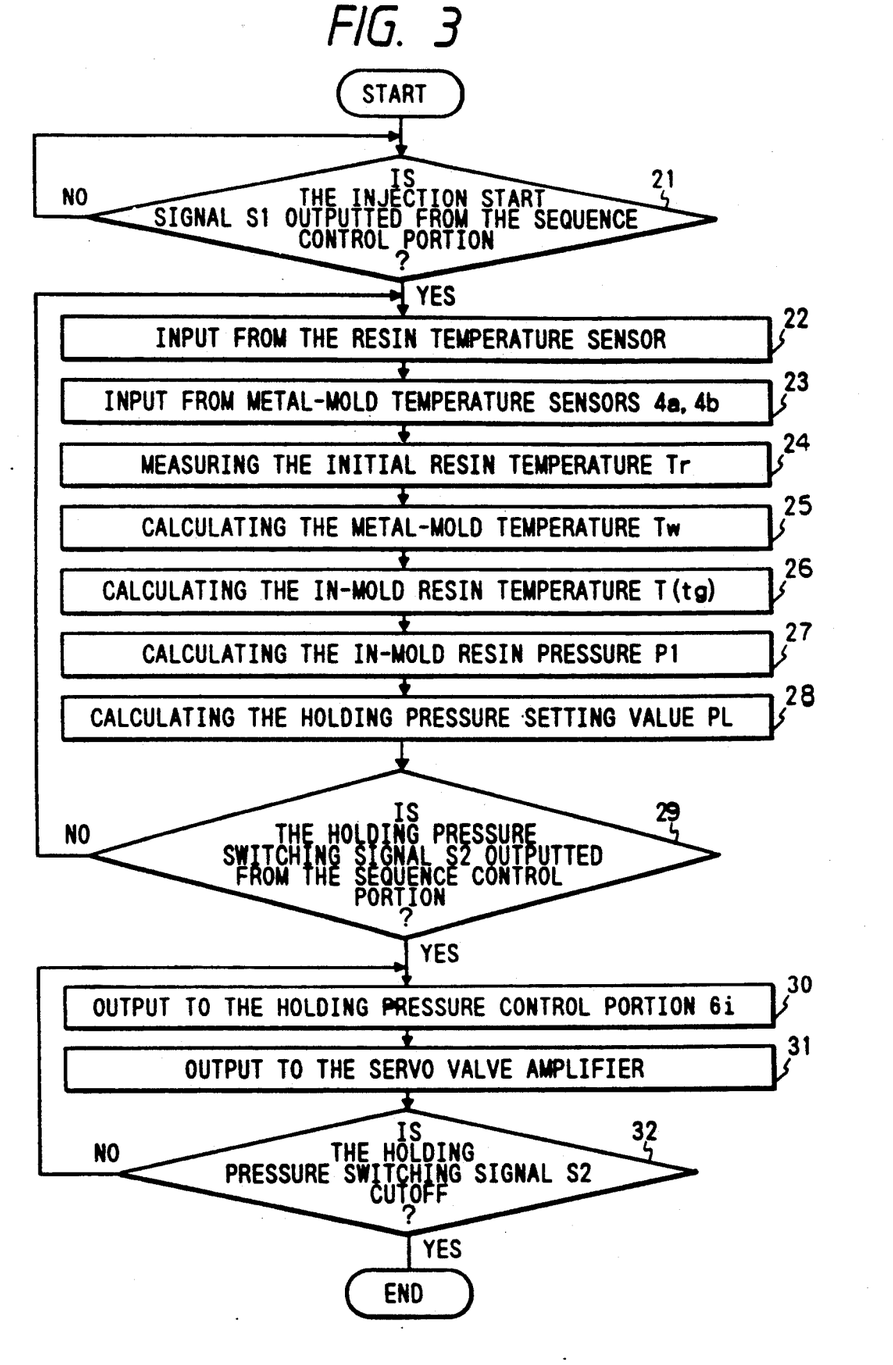
FIG. 3 is a flow chart illustrating the steps in the embodiment.

FIG. 3 is a flow chart which shows processes of this embodiment. In a process to perform a shot other than the predetermined shot, if an injection start signal S1 is outputted from the sequence control portion 8 (Step 21), the holding pressure control portion 6i receives the injection start signal S1 so that the screw 1 starts advancing in the left direction in FIG. 1. At the same time, the injection start signal S1 is supplied also to the operation processing portion 6g. Upon reception of the injection start signal S1, the operation processing portion 6g continues to receive the resin temperature from the nozzle resin path 2a and the metal-mold temperatures Tw1 and Tw2 from the metal-mold sensors 4a and 4b respectively (Steps 22 and 23) till a pressure retention switching signal S2 is outputted from the sequence control portion 8 (Step 29).

Prior to reception of the holding pressure switching signal S2, the operation processing portion 6g measures the initial resin temperature Tr on the basis of the resin temperature of the nozzle resin path 2a received from the resin temperature sensor 5 till that time (Step 24), and at the same time obtains the metal-mold temperature Tw=(Tw1+Tw2)/2 on the basis of the respective metal-mold temperatures Tw1 and Tw2 of the fixed-side and movable-side metal-molds 3a and 3b (Step 25).

Next, the operation processing portion 6g estimates the in-mold resin temperature T(tg) at the no flow time tg in accordance with the above-mentioned expression (1) (Step 26), obtains the in-mold resin pressure P(tg) required for attaining the aimed product weight W1 in accordance with the above-mentioned expression (3) (Step 27), and obtains the holding pressure setting value PL in accordance with the above-mentioned expression (5) (Step 28).

After completion of the above operations and reception of the holding pressure switching signal S2, the operation processing portion 6g supplies a voltage signal corresponding to the holding pressure setting value PL to the servo valve amplifier 7 through the holding pressure control portion 6i (Step 30), and upon reception of the voltage signal, the servo valve amplifier 7 supplies an operating voltage to the servo valve 10 so that the oil pressure force of the oil hydraulic cylinder 9 corresponds to the holding pressure setting value PL (Step 31). If the holding pressure switching signal from the sequence control portion 8 is cut off, the operation processing portion 6g and the holding pressure control portion 6i stop their output to terminate the holding pressure control (Step 32).

In this embodiment, although it is assumed that the relationship among the in-mold resin pressure P, the in-mold resin temperature T and the in-mold resin specific volume v is expressed by the above-mentioned Spencer and Gilmore state equation, the present invention is not to be limited in this.

For example, the following Tait modification equation may be used.

$$1 - v(P,T)/v(P0,T) = 0.08941 n[1 + P/B(t)] \quad (6)$$

where:
v(T,P) corresponds to the in-mold resin specific volume v in the above-mentioned expression (2), and shows a function of the in-mold resin temperature T and the in-mold resin pressure P (hereinafter referred to as "v1");

v(T,PO) represents the in-mold resin specific volume in the standard atmosphere (1atm) (hereinafter referred to as "v0");

$B(T) = -B_0 exp(-B_1 T)$; and $B_0$, $B_1$ represent the material constants.

The following expression (7) for obtaining the in-mold resin pressure P can be obtained from the above expression (6).

$$P = B(T)\{1 - exp[1/0.0894)(1 - v1/v0)]\} \quad (7)$$

Since the in-mold resin specific volume v0 in the standard atmosphere can be obtained in advance, the holding pressure setting value PL for obtaining an aimed value W1 of the weight of a molded product in each shot can be obtained by replacing the expression (3) with the expression (7) and using the expressions (4) and (5) as they are without modifying them.

Alternatively, the following Breuer and Rehage equation may be used.

$$v(P,T) = v_0 + \phi_0(T+273) \\ - (K_0/a)[1 + b(T+273)]1n(1+aP) \quad (8)$$

where:
- a,b represent the material constants;
- $v_0$ represents the in-mold resin specific volume under the in-mold resin temperature $T=0°$ C. and the standard atmosphere;
- $\phi_0=(\partial v/\partial T)_P$, the value under the in-mold resin temperature $T=0°$ C. and the standard atmosphere; and
- $K_0=(\partial v/\partial T)_T$, the value under the in-mold resin temperature $T=0°$ C. and the standard atmosphere.

The following expression (9) for obtaining the in-mold resin pressure P can be obtained from the above expression (8).

$$P=(1/a)[exp\{[v1-v_0-\phi_0(T+273)](a/K_0)[1+b(T+273)]\}-1] \quad (9)$$

In the same manner as the above-mentioned expression (7), the holding pressure setting value PL for obtaining an aimed value W1 of the weight of a molded product in each shot can be obtained by replacing the expression (3) with the expression (9).

Figure 4:
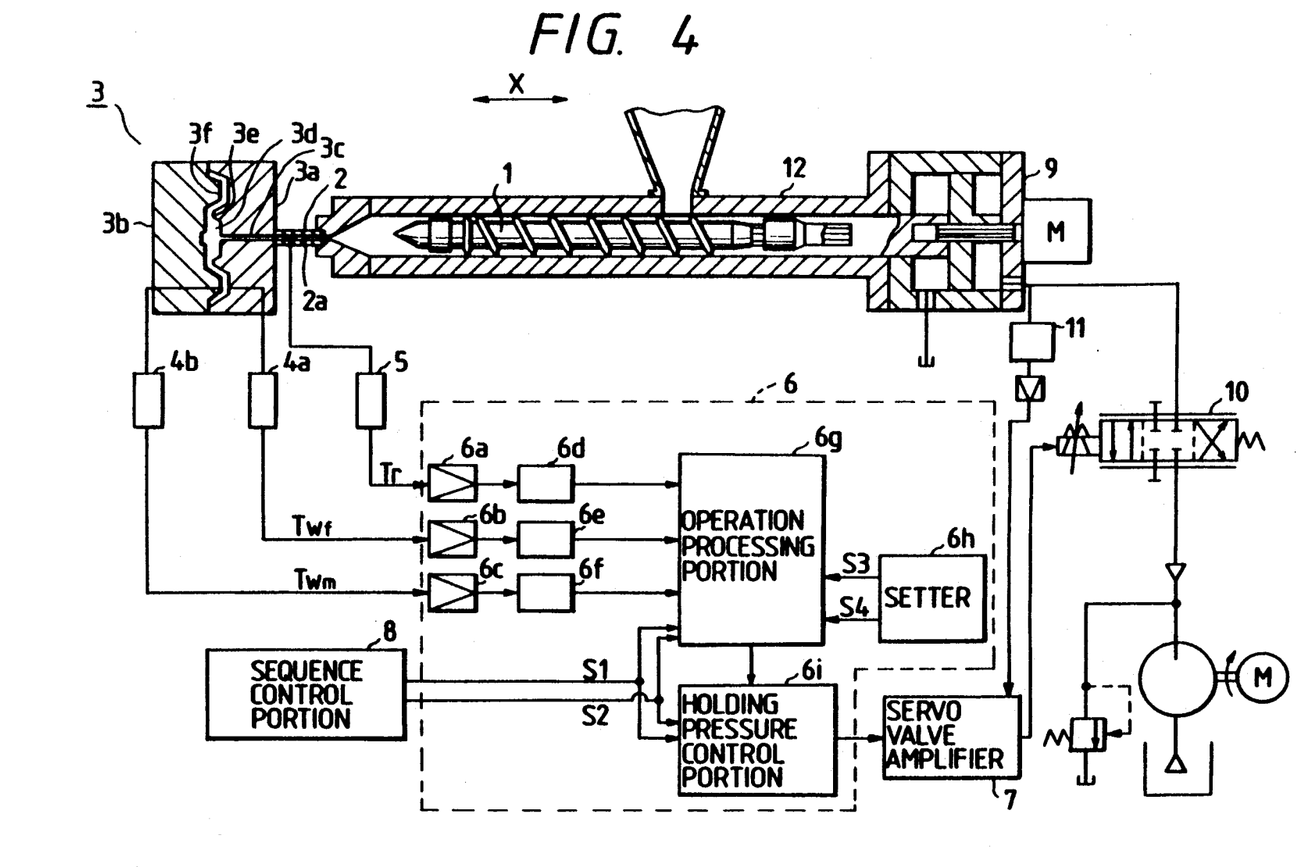
FIG. 4 is a diagram illustrating another embodiment of the present invention.

FIG. 4 is an explanatory diagram illustrating another embodiment of the present invention, in which parts the same as those in the above-mentioned embodiment are referenced correspondingly.

In this embodiment, an operation processing portion 6g is constituted by a microcomputer for computing and estimating the in-mold resin temperature T(t,x), which will be described later, on the basis of the respective outputs of A/D converters 6d, 6e and 6f, a setting value S3 and a computation command S4 set in a setter 6h, and an injection start signal S1 or a holding pressure switching signal S2 supplied from a sequence control portion 8 for making various timings. The microcomputer supplies a holding pressure setting value corresponding to the computed and estimated in-mold resin temperature T(t,x), as a digital signal, to a holding pressure control portion 6i, and makes a not-shown display means display the computed and estimated in-mold resin temperature T(t,x). The holding pressure control portion 6i converts, into a voltage signal, the digital signal which is supplied from the operation processing portion 6g and which expresses the holding pressure setting valve. Then, the holding pressure control portion 6i supplies the voltage signal to a servo valve amplifier 7. The servo valve amplifier 7 uses the value of the voltage signal supplied from the holding pressure control portion 6i as a holding pressure setting value, and supplies a control voltage to a servo valve 10 on the basis of a detection value of an oil pressure sensor 11 for detecting the pressure of an oil hydraulic cylinder 9, so as to make the pressure of the oil hydraulic cylinder 9 take the holding pressure setting value.

Next the computation and estimation of the in-mold resin temperature T(t,x) by the operation processing portion 6g will be described.

First, the fixed-side metal-mold reference temperature Twfs, the movable-side metal-mold reference temperature Twms, the initial resin reference temperature Trs, the thickness R of a molded product in the sectional direction, that is, in the direction of arrow X, the thermal conductivity K of the molding material, the heat transfer coefficient h between the molding material and the metal-mold wall surface, the density $\rho$ of the molding material, the specific heat Cp of the molding material, the time t to be a subject of computation, the distance x from the wall surface of a movable-side metal mold 3b in the sectional direction, that is, in the direction of arrow X, which is used as a position to be a subject of computation, the repetition number N of series calculation, and the flowability stop temperature Tg, are set in advance before running of injection molding.

Figure 5:
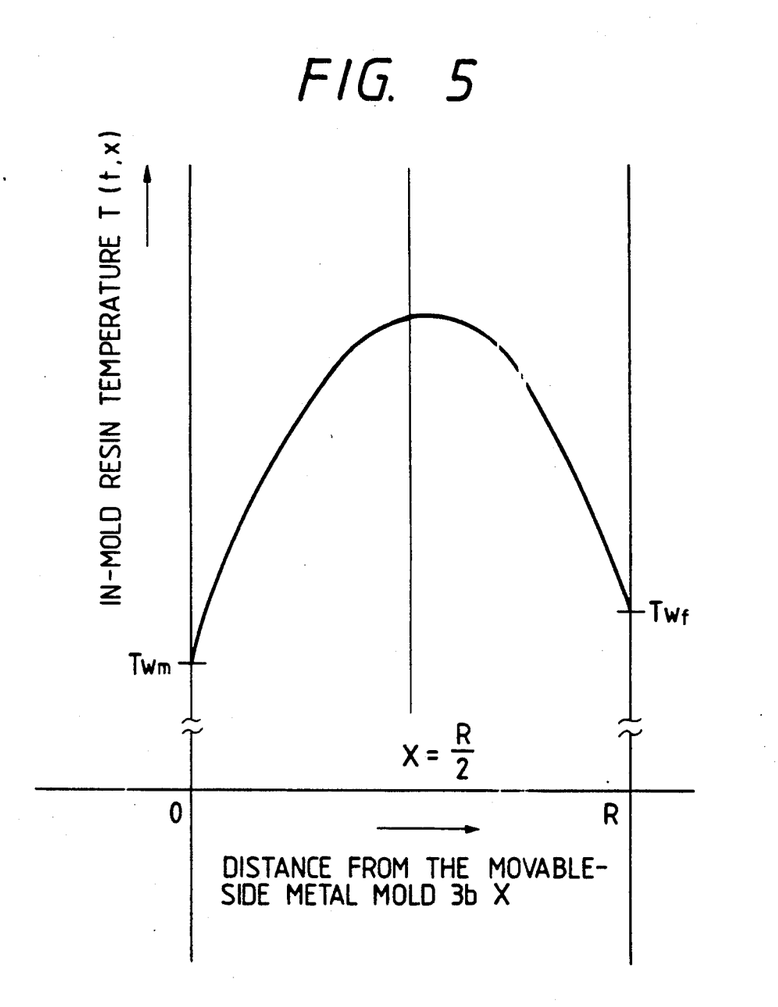
FIG. 5 is a graph illustrating a state of the in-mold resin temperature in the embodiment shown in FIG. 4.

The glass transfer temperature of the molding material, the crystallization temperature, the no flow temperature, etc. may be used as the above-mentioned setting value Tg. Further, as the above-mentioned time t, the time tf based on the initiation of the filling as a starting point of time may be used, so that it is possible to perform series calculation by dividing the time from the start of filling till the time tf into time intervals $\Delta t$. In addition, as the position x, the distance from the wall surface of the movable-side metal mold 3b (in the axial direction of a screw 1 which is the direction of the arrow X, that is, in the sectional direction) may be used within a range $0 \leq x \leq R$. In this case, as shown in FIG. 5, the in-mold resin temperature T(t,x) draws a curve which is low in the vicinity of the respective walls of the fixed-side and movable side metal molds 3a and 3b which define a cavity portion 3f, while high in the vicinity of the center of the cavity. It is therefore necessary to properly set the position x in accordance with a purpose. Values in a molding cycle in which good products were molded may be used as these setting values.

Next, the following expression (10), which is a non-linear equation, is solved in advance by use of the above-mentioned setting values so as to obtain solutions nj from j=0 to j=N (N is the above-mentioned repetition number which is generally in a range of from about 10 to 100). Then the in-mold resin reference temperature Ts(t,x) is obtained for every time interval $\Delta t$ till the time t=tf by the following expression (11) as a solution of unsteady state heat conduction analysis.

$$\tan(nj \cdot R/2) = (h/K) \cdot nj \quad (10)$$

$$Ts(t,x) = Twfs + A + B \cdot x + \sum_{j=0}^{N} \exp(-\alpha \cdot nj^2 \cdot t) \cdot Dj \cdot \{(K/h) \cdot nj \cdot \cos(nj \cdot x) + \sin(nj \cdot x)\} \quad (11)$$

where:
- $\alpha = k/(\rho \cdot Cp)$;
- $A = (1-S/h) \cdot (Twms-Twfs)$;
- $B = -(S/K) \cdot (Twms-Twfs)$;
- $S = 1/(2/h+R/K)$;
- $\tan(nj \cdot R/2) = (h/K)/nj$; and
- $Dj = 4 \cdot (h/K)^2 \cdot \{Trs-(Twfs+Twms)/2\}/[nj \cdot \{nj^2+(h/K)^2 \cdot R+2(h/K)\}]$ At the same time, the respective rates of changes $\partial T/\partial Twf$, $\partial T/\partial D$ and $\partial T/\partial Tr$ of the in-mold resin temperature T(t,x) based on the fixed-side metal-mold temperature Twfs, the movable-side metal-mold temperature Twms and the initial resin temperature Trs; and the coefficients $\xi_1$, $\xi_2$, and so on (hereinafter referred to as "change rates and so on"), which can be obtained from the above-mentioned in-mold resin reference temperature, are obtained in advance by the following expressions (12) through (16).

$$\partial T/\partial Twf = \{Trs-Ts(t,x)-(R/2-x) \cdot \xi_2 \cdot D\}/(Trs-Tws) \quad (12)$$

$$\partial T/\partial \delta = [(\xi_1 + x\cdot\xi_2)\cdot(Trs - Tws) - (\frac{1}{2})\cdot\{Ts(t,x) - Twfs - (\xi_1 + x\cdot\xi_2)\cdot D\}]/(Trs - Tws) \quad (13)$$

$$\partial T/\partial Tr = \{Ts(t,x) - Twfs - (\xi_1 + x\cdot\xi_2)\cdot D\}/(Trs - Tws) \quad (14)$$

$$\xi_1 = (1 + h\cdot R/K)/(2 + h\cdot R/K) \quad (15)$$

$$\xi_2 = -(h/K)/(2 + h\cdot R/K) \quad (16)$$

where: Tws=(Twms+Twfs)/2, D=TwMs−TwPs

During running of injection molding, the fixed-side metal-mold temperature Twf, the movable-side metal-mold temperature Twm and the initial resin temperature Tr are measured for every molding cycle. By use of the in-mold resin reference temperature Ts(t,x) obtained by the expression (11) and the change rates and so on obtained by the expressions (12) through (16), computed and estimated is the in-mold resin temperature T(t,x) in the molding cycle (in the filling stage or in the cooling stage). This computation and estimation is performed by the following expression (17) in which correction is made on the in-mold resin reference temperature Ts(t,x) in accordance with the influences, onto the in-mold resin temperature, of the deviations of the measured fixed-side metal-mold temperature Twf, the measured movable-side metal-mold temperature Twm, and the measured injected-resin temperature Tr from their reference temperature values respectively. As the injected-resin temperature Tr, it is possible to use the maximum value or the temporal average value of the measure values from the start of injection till the start of holding pressure, a sampled value at the time of start of injection, a sampled value at the time of start of holding pressure, or the like.

$$T(t,x) = Ts(t,x) + (\partial T/\partial Twf)\cdot\Delta Twf + (\partial T/\partial D)\cdot\Delta D + (\partial T/\partial Tr)\cdot\Delta Tr \quad (17)$$

where:
ΔTwf=Tws−Twfs;
D=Twms−Twfs;
ΔD=(Twm−Twf)−(Twms−Twfs); and
ΔTr=Tr−Trs

In the above-mentioned manner, reference in-mold resin temperature Ts(t,x) is calculated in advance before running, and in-mold resin temperature T(t,x) in a molding cycle is estimated every molding cycle during running.

Although the in-mold resin temperatures at predetermined positions are obtained in the above-mentioned embodiment, the average in-mold resin temperature in the sectional direction illustrated by the arrow X may be obtained.

In this case, the average in-mold resin temperature Tsave(t) is obtained by use of the following expression (18) in stead of (or together with) the expression (11).

$$Tsave(t) = Tws + (Trs - Tws)\cdot \sum_{J=0}^{N} Dja\cdot\exp(-\alpha\cdot nj^2\cdot t)\cdot$$
$$\left[(K/h)\cdot\{\sin(nj\cdot R)/R\} + \frac{1}{nj\cdot R} - \frac{1}{nj\cdot R}\cdot\cos(nj\cdot R)\right] \quad (18)$$

where: $Dja = 4\cdot(h/k)^2/[nj\cdot\{nj^2 + (h/k)^2\cdot R + 2\cdot(h/k)\}]$

During running of injection molding, the fixed-side metal-mold temperature Twf, the movable-side metal-mold temperature Twm and the initial resin temperature Tr are measured for every molding cycle, and by use of the average in-mold resin reference temperature Tsave(t) obtained by the expression (18), the in-mold resin temperature Tave(t) in the molding cycle is computed and estimated by the following expression (19).

$$Tave(t) = Tsave(t) + \{(Trs - Tsave(t))\cdot\Delta Tws + (T-save(t) - Tws)\cdot\Delta Tr\}/(Trs - Tws) \quad (19)$$

where: ΔTws=(Twf+Twm)/2−(Twfs+Twms)/2

Obtaining the in-mold resin temperature averaged in the section direction can be computed at a higher speed than obtaining the in-mold resin temperature at set positions. Preferably, therefore, not only the in-mold resin reference temperature Ts(t,x) but also the average in-mold resin reference temperature Tsave(t) are obtained by the expressions (11) and (18) respectively in advance, and the in-mold resin temperature is properly estimated during running of injection molding in accordance with the purpose.

The present invention which has the above-mentioned configurations has the following advantages.

It is not necessary to attach a pressure sensor in a mold, and it is not necessary to provide additional data such as the thickness of molded products, the effective heat diffusion rate, and so on, so that it is possible to reduce the cost for controlling pressure retention, and it is therefore possible to reduce the price of a molded product.

Since only the steps which do not require a great deal of time are performed during running of the injection molding process, it is possible to estimate the in-mold resin temperature at a high speed in the filling stage. In addition, since approximate errors can be eliminated, it is possible to estimate the in-mold resin temperature with a high accuracy. Further, since it is possible to estimate the in-mold resin temperature in the filling stage, that is, before the holding pressure and cooling stage, it is possible to perform process control, process monitoring, and so on, easily and surely.

What is claimed is:

1. A method of controlling holding pressure in injection molding, comprising the steps of:
    injecting melted resin from a cylinder of an injection molding machine into a cavity of a metal mold through a nozzle and resin paths by advancement of a screw, said injecting step further including the steps of:
        estimating what the value of in-mold resin temperature will be at a given time in a holding pressure stage on the basis of metal-mold temperature and resin temperature in said resin path during said injecting step;
        obtaining in-mold resin pressure which is required for attaining a desired weight of a molded product from the estimated in-mold resin temperature;
        obtaining a holding pressure setting value based on the obtained in-mold resin pressure; and
    retaining a holding pressure, during said holding pressure stage, in said cavity by pressing said screw after injecting said melted resin into said cavity so as to compensate for shrinkage of said melted resin which is caused as said melted resin is cooled and solidified in said cavity, said retaining step further including the step of:
        controlling the value of said holding pressure by the obtained holding pressure setting value.

2. A method of controlling holding pressure according to claim 1, wherein the in-mold resin temperature in said holding pressure stage is estimated from the following equation:

$$T(t) = Ts(t) + \{Trs - Ts(t)\}(Tw - Tws)/(Trs - Tws) + \{Ts(t) - Tws\}(Tr - Trs)/(Trs - Tws)$$

where:
- Tw represents the metal-mold temperature;
- Tws represents the metal-mold temperature in a shot in which a good product was molded;
- Tr represents the resin temperature in said resin paths;
- Trs represents the resin temperature in said resin paths in a shot in which a good product was molded; and
- t represents time.

3. A method of controlling holding pressure according to claim 1, wherein said given time corresponds to a time, the same where no flow temperature was established in a previous shot in which a good molded product was obtained.

4. A method of controlling holding pressure according to claim 1, wherein each of said in-mold resin pressure and said in-mold resin temperature is expressed as a function of a specific volume of the in-mold resin.

5. A method of controlling holding pressure in injection molding, which has an injecting stage for injecting melted resin from a cylinder of an injection molding machine into a cavity of a metal mold, and a holding pressure and cooling stage for applying a pressure to said cavity after injecting said melted resin into said cavity so as to compensate for shrinkage of said melted resin which is caused as said melted resin is cooled and solidified in said cavity, comprising the steps of:
- injecting resin from said cylinder into said cavity of said metal mold;
- obtaining an in-mold resin reference temperature based on a solution of unsteady state heat conduction analysis using values obtained from a previous process;
- measuring metal-mold temperature and injected-resin temperature during injection;
- correcting said in-mold resin reference temperature correspondingly for influences due to deviations of said measured metal-mold temperature and injected-resin temperature from respective reference temperature values thereof; and
- calculating and estimating in-mold resin temperature in one of said injecting stage and said holding pressure and cooling stage.

6. A method of estimating in-mold resin temperature of a mold in an injection molding machine, comprising the steps of:
- injecting resin from a cylinder into a cavity of said mold;
- estimating said in-mold resin temperature based upon the following equation:

$$Ts(t,x) = Twfs + A + B \cdot x + \sum_{j=0}^{N} \exp(-\alpha \cdot nj^2 \cdot t) \cdot Dj \cdot (K/h) \cdot nj \cdot \cos(nj \cdot x) + \sin(nj \cdot x)\}$$

where:
- Twfs represents the fixed-side metal-mold temperature;
- Twms represents the movable-side metal-mold temperature;
- Trs represents the injected-resin temperature;
- R represents the thickness of a molded product;
- K represents the thermal conductivity of molding material;
- h represents the heat transfer coefficient between the molding material and the metal-mold wall surface;
- $\rho$ represents the density of the molding material;
- Cp represents the specific heat of the molding material;
- x represents the position to be a subject of calculation;
- $\alpha = K/(\rho \cdot Cp)$;
- $A = (1 - S/h) \cdot (Twms - Twfs)$;
- $B = -(S/K) \cdot (Twms - Twfs)$;
- $S = 1/(2/h + R/K)$;
- $\tan(nj \cdot R/2) = (h/K)/nj$;
- $Dj = 4 \cdot (h/K)^2 \cdot \{Trs - (Twfs + Twms)/2\}/[nj \cdot \{nj^2 + (h/K)^2 \cdot R + 2(h/K)\}]$;
- N represents the number of repetitions of series; and
- t represents the point of time of the calculation;

and wherein
said in-mold resin temperature T(t,x) being estimated based upon the following expression:

$$T(t,x) = Ts(t,x) + (\delta T/\delta Twf) \cdot \Delta Twf + (\delta T/\delta D) \cdot \Delta D + (\delta T/\delta Tr) \cdot \Delta Tr$$

where:
- Twf represents the measured fixed-side metal-mold temperature;
- Twm represents the measured movable-side metal-mold temperature;
- Tr represents the measured injected-resin temperature;
- $\Delta Twf = Twf - Twfs$;
- $D = Twms - Twfs$;
- $\Delta D = (Twm - Twf) - (Twms - Twfs)$;
- $\Delta Tr = Tr - Trs$;
- $\delta T/\delta Twf = \{Trs - Ts(t,x) - (R/2 - x) \cdot \xi_2 \cdot D\}/(Trs - Tws)$;
- $\delta T/\delta D = [(\xi_1 + x \cdot \xi_2) \cdot (Trs - Tws) - (\frac{1}{2}) \cdot \{Ts(t,x) - Twfs - (\xi_1 + x \cdot \xi_2) \cdot D\}]/(Trs - Tws)$;
- $\delta T/\delta Tr = \{Ts(t,x) - Twfs - (\xi_1 + x \cdot \xi_2) \cdot D\}/(Trs - Tws)$;
- $\xi_1(1 + h \cdot R/K)/(2 + h \cdot R/K)$;
- $\xi_2 = -(h/K)/(2 + h \cdot R/K)$; and
- $Tws = (Twms + Twfs)/2$ 7. An apparatus for controlling holding pressure in an injection molding machine, comprising:
- a metal mold;
- a metal-mold temperature sensor disposed on said metal mold for detecting a temperature of said metal mold;
- a resin temperature sensor disposed in resin paths for detecting the temperature of melted resin in said resin paths;
- an operation processing means for estimating what the value of an in-mold resin temperature will be in a holding pressure stage on the basis of the respective detection values of said metal-mold temperature sensor and said resin temperature sensor during injection, for obtaining the in-mold resin pressure required for attaining a predetermined weight of a product from said estimated in-mold resin temperature, and for obtaining a holding pressure setting value from said in-mold resin pressure; and a holding pressure control means for controlling holding pressure on the basis of said holding pressure setting value obtained by said operation processing means.

8. An apparatus for estimating resin temperature in injecting molding, wherein an injecting stage for injecting melted resin into a cavity portion of a metal mold, and a holding pressure and cooling stage for applying a pressure to said cavity after said injecting state so as to compensate for shrinkage of said melted resin which occurs as said melted resin is cooled and solidified in said cavity, comprising:

an injection cylinder coupled to said cavity portion by resin paths formed in said mold a metal-mold temperature sensor disposed on said metal mold for detecting temperature of said metal mold;

a resin temperature sensor disposed in said resin paths for detecting injected-resin temperature in resin paths of said mold; and operation processing means for obtaining an in-mold resin reference temperature based on a solution of unsteady state heat conduction analysis before said injecting stage, and for receiving said metal-mold temperature and said injected-resin temperature respectively detected by said metal-mold temperature sensor and said resin temperature sensor during said injection stage, and for correcting said in-mold resin reference temperature correspondingly for influences due to deviations of said received metal-mold temperature and injected-resin temperature from respective reference temperature values thereof to thereby calculate and estimate in-mold resin temperature in said filling stage or in said holding pressure and cooling stage.

* * * * *